Patented May 10, 1949

2,469,546

UNITED STATES PATENT OFFICE 2,469,546

METHOD OF FORMING PROTEIN COMPOSITIONS

John R. Calhoun, Bainbridge, and Thomas M. Buzzo, Unadilla, N. Y., assignors to The Borden Company, New York, N. Y., a corporation of New Jersey No Drawing. Application January 7, 1947, Serial No. 720,680

12 Claims. (Cl. 106—146)

The present invention is directed to improvements in or relating to the production of protein compositions and articles prepared therefrom. In particular, this invention relates to methods for preparing protein compositions which may be used as binders, laminants, castings, coatings, or in the manufacture of shaped structures such, for example, as sheets, films, fibres, rods, threads, filaments, and the like.

The presence of air bubbles in such compositions may produce serious defects in the final product unless such bubbles are removed prior to use. In the production of protein fibres, for example, the ideal protein dispersion is one which is entirely freed of all air bubbles prior to being forced through the nozzles of the spinneret. Unless the protein dispersion is substantially free of air bubbles, each bubble, as it passes through the nozzle, either impedes or entirely interrupts the continuous flow of the dispersion, producing broken ends, or else results in the formation of a hollow filament surrounded by a thin shell of protein which forms a weak, porous structure. Furthermore, such air bubbles increase the tendency for the dispersion to stick to the face of the spinneret, thus causing "blebs," roughness or irregularities along the fibre length as it is extruded.

The problem is a serious one. Many solutions have been proposed, and as many attempts made, for the removal of air bubbles from protein dispersions prior to extrusion. For example, it has been proposed to simply allow the protein solution to stand quietly until all the air bubbles rise to the top, whereupon they are permitted to burst or become deflated. This practice, while simple enough, is very time-consuming. Protein solutions of ordinary wet spinning viscosities usually require a minimum of 12 to 15 hours standing in order to allow all the bubbles to rise to the surface. Such a method moreover necessitates extra storage space, a large number of vessels, and various other equipment for pumping the solution into and out of storage. In addition, particularly in warm weather, the protein solution is likely to putrefy on standing such length of time, and hydrolysis and oxidation reactions often take place causing a thinning in viscosity and a general degradation of the protein molecule.

Various defoamers and anti-foaming agents have also been proposed for reducing or eliminating the air bubbles alone and also in combination with mechanical methods, such as the application of vacuum to the protein solution.

More recently, other attempts have been made to solve the problem of removing air bubbles such, for example, by subjecting the protein solution to a vacuum treatment, preferably at an elevated temperature. The time element is considerably shortened using this method, i. e., about a 1 to 2 hour process. This advantage, however, is offset by the disadvantage of an increase in the tendency for hydrolysis to take place more rapidly in the solution, particularly at elevated temperatures. Moreover, the use of vacuum, particularly on hot dispersions, is not satisfactory because too high a vacuum causes the dispersion to boil, which produces more air bubbles which are very difficult to remove. Careful adjustment, therefore, must be made in the degree of vacuum applied to the solution, requiring constant watch over the controls. On the whole, such methods which employ vacuum apparatus in the removal of air bubbles from protein solutions are at best only partial answers to the problem involved.

In a recent British patent, No. 573,865, it is stated that casein solutions may be freed from air therein in a surprisingly complete and quick manner by raising the temperature of a solution of sodium caseinate to about 50° C. in a closed vessel of about six times the volume of the solution, while evacuating the vessel to a reduced pressure of about 14 to 16 cm. of mercury. It is further stated that the vacuum should be reduced as the solution begins to boil and foam and as the foam disappears. However, such process requires expensive equipment, especially if vessels are needed which are six times the size of ordinary vessels and if such vessels are required to be stainless or glass lined. There is also the added requirement of more space for the larger equipment and more time required to carry out the steps of heating, and the like.

It was, therefore, a general object of the present invention to provide a simple and efficient method for producing protein dispersions substantially free from air bubbles.

It was a further object of the invention to provide a method for producing bubble-free protein dispersions without the use of special or elaborate equipment.

It was another object of the invention to provide a method for removing air bubbles from protein dispersions without increasing the danger of putrefaction setting in or other objectionable reactions taking place, such as premature gelling, change of viscosity, or substantial oxidation or hydrolysis of the protein material.

It was a still further object of the invention to provide protein compositions satisfactory for use in forming shaped structures which are substantially free from "blebs" or other irregularities caused by the presence of air bubbles in the viscous mass during extrusion or casting.

Other objects of the invention will in part be obvious, and will in part be apparent from the following detailed disclosure of our invention.

While it is not exactly known how air bubbles are formed in protein dispersions, it is our present theory that most of the air bubbles normally occurring or found in any solution made in the conventional manner are the result of air adsorbed on the surfaces of the granules of the dry protein material, and are not necessarily caused by the agitation necessary to cause the protein material to go into solution as has been heretofore commonly believed.

Our invention, therefore, lies in the discovery that protein solutions may be made which are substantially free of air bubbles by simply removing the adsorbed air from the protein particles before the protein material is chemically dissolved. In our now preferred embodiment, a slurry of the protein is formed with water and this slurry then subjected to a moderately high vacuum, preferably with some agitation. The protein particles may be permitted to swell to some degree, but the protein does not dissolve. The air which is adsorbed on the surfaces of the protein particles is thus separated and removed from the material prior to the forming of the protein solution. The amount of vacuum applied may be varied considerably, but we have found that a vacuum of about 25 inches of mercury is ordinarily adequate for most purposes. Agitation may be provided by stirring or by vibrating the container holding the slurry or by any other suitable methods or apparatus.

After the deaeration is carried out, the protein-water slurry may then be treated with the various solvents ordinarily used for dissolving the protein. If care is used in stirring such solvent into the slurry, a solution is obtained which is substantially entirely free from air bubbles. However, in industrial plants using ordinary commercial apparatus wherein such meticulous care cannot be taken or is not practical, a solution prepared from the deaerated slurry may be formed in the ordinary way, and accordingly may contain a few relatively large-sized bubbles as a result of the stirring required to effect solution of the protein in the solvent. Moreover, for spinning purposes, such solutions ordinarily must be filtered and cooled before use, and these processes too may introduce a few relatively large-sized bubbles. Since these bubbles are large, however, they rise fairly quickly to the top and may be eliminated by permitting the solution to stand a short time prior to use, usually a minute or a very few minutes. However, there are substantially no small bubbles formed or present in the solution.

For example, a dispersion of casein in granular form may be prepared by allowing the protein to soak in water at room temperature for about 20 minutes to permit the granules to swell. The deaeration process may be carried out in a closed-top kettle and vacuum applied to the kettle in the usual manner. A vacuum of about 25 inches of mercury may be applied to the surface of the liquid during this 20-minute soaking period. Thereafter, when the casein slurry is dissolved by means of a suitable solvent, very few bubbles, if any, are formed in the solution and the solution is satisfactory for immediate use.

Various proteins which may be deaerated in the manner described comprise casein, albumin, gelatine, fish proteins; also seed proteins such as soybean proteins, peanut proteins, and the like; the so-called cold-water soluble proteins; proteins produced from various leguminous proteins, such as vegetable protein, and the like; also mixtures of various protein materials. The scope of the invention is also intended to include finely ground seed meals such, for example, as soybean meal, which may contain appreciable quantities of non-protein material, and the term "protein" as used in the specification and claims is intended to embrace all such various substances. It is preferred that the particle size of the dry protein be relatively large, as it has been found that if the particles are quite small or in powdered form the step of deaeration of the protein-cold water slurry will require a longer time. In general, the preferred particle size of the dry protein is in the range of 325 mesh to 10 mesh.

It has also been found helpful to add about ½% by weight of a defoamer or anti-foaming agent to the protein-water slurry during the step of preparation and/or swelling, before or during the vacuum operation, as such substances help to prevent the formation of large bubbles which may be formed by reason of agitation. In selecting a defoamer, it is preferred that there be used such agent which is efficient in preventing the formation of foam, rather than one which is added for the purpose of breaking foam already present. In the selection of a defoamer, we have found tributyl citrate to be particularly effective. However, it is to be understood that other defoamers may be employed if so desired, such as pine oil, octyl alcohol, tributyl phosphate, and the like.

No special equipment is required except a closed head mixing kettle, which would be necessary in any case if compressed air is used to force the dispersion out of the tank. Moreover, no additional processing time is required, since the deaeration may be conducted during the time ordinarily allowed for the protein to soak or swell in the dispersion media.

It is not intended that the process of this invention be limited to caustic soda as the solvent which may be employed to chemically dissolve the protein slurry after it is deaerated. Any other solvent, such as ammonium hydroxide, trisodium phosphate, triethanolamine, borax, and the like, or mixtures thereof, may be employed to effect solution of the protein.

The following examples are given by way of illustration, and not by way of limitation. Unless otherwise stated, all parts are by weight.

*Example I*

908 grams of granular muriatic-pressed casein were slowly stirred into 3400 grams of water at room temperature in a closed-top vessel. A vacuum of 25 inches of mercury was applied to the closed vessel, and the slurry agitated by means of an electric stirring device. This treatment was continued for 30 minutes. The vacuum was removed, 250 grams of 10% NaOH solution then added, and the dispersion gradually heated with mild agitation to 170° F. At about 150° F., 23 grams of tributyl citrate and 18 grams of preservative were stirred into the dispersion. After reaching 170° F., the solution was found to be substantially entirely free of air bubbles.

Example II 950 grams of granular alpha soya protein was stirred into 3600 grams of water in a closed vessel. A vacuum of 25 inches of mercury was applied, which vacuum was broken occasionally to allow the mixture to be stirred by hand with a paddle. Approximately 30 minutes after the start of the alternate vacuum-stirring treatment, the vacuum was broken, 160 grams of 27½% NaOH solution added, and the mixture stirred occasionally for 1½ hours without heat until the dispersion was complete. The finished dispersion was substantially free from air bubbles.

In connection with the present invention, a vacuum on the completed dispersion may be used if desired to assist in removing larger air bubbles incorporated after the initial deaeration.

As one of many variations which may be employed in the practice of our invention, a partial vacuum may be drawn on the dry protein material, water introduced at the bottom of the vessel, and the vacuum then re-applied or continued while the slurry is being formed. Further, the water or other dispersion media used in the process may itself be deaerated prior to being introduced with the protein material. Instead of water, the protein material may be initially dispersed in any liquid medium which is a non-solvent for the protein, and thereafter dissolved after being subjected to deaeration.

Alternatively, instead of breaking the vacuum after deaerating the slurry, a solvent such as an alkali solvent may be introduced into the slurry simultaneously with the deaeration step, preferably in solution form and in concentration sufficient to yield the alkali-solvent concentrate desired for forming the final dissolved product.

The advantage of our process over all the prior art including that discussed above may be explained on the basis of the viscosity of the surrounding medium. The rate of rise of air bubbles in a liquid medium is, when other variables are kept constant, inversely proportional to the viscosity of the medium. The thicker the viscosity, the slower the rise of the air bubbles. For example, in our process, water is the preferred surrounding medium and the slurry comprises the protein granules in water. The viscosity of water is approximately 1 centipoise at room temperature. On the other hand, the viscosity of a 20% casein solution at 170° F. is approximately 300 centipoises, and this increases to approximately 50,000 centipoises as it cools to 80° F.

Since certain changes in carrying out the above process and certain modifications in the composition which embody the invention may be made without departing from its scope, it is intended that all matter contained in the above description shall be interpreted as illustrative and not in a limiting sense.

It is to be understood that the following claims are intended to cover all of the generic and specific features of the invention herein described, and all statements of the scope of the invention, which as a matter of language, might be said to fall therebetween.

Having described our invention, what we claim as new and desire to secure by Letters Patent is:

1. In a process for producing protein compositions which are substantially free from bubbles, the steps comprising dispersing a protein material in a liquid which is a non-solvent for the protein, reducing the pressure above the liquid dispersion sufficiently to substantially deaerate the dispersion, and thereafter adding a solubilizing agent for said protein and dissolving said protein material.

2. In a process for producing protein compositions which are substantially free from bubbles, the steps comprising dispersing a protein material in a liquid which is a non-solvent for the protein, reducing the pressure above the liquid dispersion sufficiently to substantially deaerate the dispersion, agitating the dispersion, and thereafter adding a solubilizing agent for said protein and dissolving said protein material.

3. In a process for producing protein compositions which are substantially free from bubbles, the steps comprising dispersing a protein material in water, reducing the pressure above the liquid dispersion sufficiently to substantially deaerate the dispersion, and thereafter adding a solubilizing agent for said protein and dissolving said protein material.

4. In a process for producing protein compositions which are substantially free from bubbles, the steps comprising dispersing a protein material in a liquid which is a non-solvent for the protein, applying a vacuum of about 25 inches of mercury to the dispersion, and thereafter adding a solubilizing agent for said protein and dissolving said protein material.

5. In a process for producing protein compositions which are substantially free from bubbles, the steps comprising dispersing a protein material in a liquid which is a non-solvent for the protein, and simultaneously reducing the pressure above the liquid dispersion sufficiently to substantially deaerate the dispersion while introducing a solubilizing agent for said protein into the dispersion and dissolving said protein material.

6. In a process for producing protein compositions which are substantially free from bubbles, the steps comprising dispersing a comminuted protein material of particle size between 325 mesh and 10 mesh in a liquid which is a non-solvent for the protein, reducing the pressure above the liquid dispersion sufficiently to substantially deaerate the dispersion, and thereafter adding a solubilizing agent for said protein and dissolving said protein material.

7. In a process for producing protein compositions which are substantially free from bubbles, the steps comprising dispersing a protein material in a liquid which is a non-solvent for the protein, reducing the pressure above the liquid dispersion sufficiently to substantially deaerate the dispersion, and thereafter dissolving said protein material in an alkaline solution.

8. In a process for producing protein compositions which are substantially free from bubbles, the steps comprising dispersing a protein material in a liquid which is a non-solvent for the protein, adding to said liquid an anti-foaming agent, reducing the pressure above the liquid dispersion sufficiently to substantially deaerate the dispersion, and thereafter adding a solubilizing agent for said protein and dissolving said protein material.

9. In a process for producing protein compositions which are substantially free from bubbles, the steps comprising dispersing a comminuted protein material having a particle size between 325 mesh and 10 mesh in water, reducing the pressure above the liquid dispersion sufficiently to substantially deaerate the dispersion, thereafter adding an alkaline solvent for said protein, and thereby dissolving said protein material.

10. In a process for producing protein compositions which are substantially free from bubbles, the steps comprising dispersing a comminuted protein material having a particle size between 325 mesh and 10 mesh in water for about 20 minutes to permit the granules to swell, applying a vacuum of about 25 inches of mercury to the dispersion during said 20-minute period, thereafter adding an alkaline solvent for said protein comprising caustic soda, and dissolving said protein material.

11. In a process for producing casein compositions which are substantially free from bubbles, the steps comprising dispersing a comminuted casein material in water, applying a vacuum of about 25 inches of mercury to the dispersion, agitating for about 30 minutes, adding a solubilizing agent for said casein comprising caustic soda, and gradually heating to 170° F. with mild agitation to dissolve said casein material.

12. In a process for producing alpha soya protein compositions which are substantially free from bubbles, the steps comprising dispersing a comminuted alpha soya protein material in water, applying a vacuum of about 25 inches of mercury to the dispersion, agitating for about 30 minutes, adding a solubilizing agent for said alpha soya protein comprising caustic soda, and mildly agitating at room temperature thereby dissolving said alpha soya protein material.

JOHN R. CALHOUN.
THOMAS M. BUZZO.

REFERENCES CITED

The following references are of record in the file of this patent:

UNITED STATES PATENTS

| Number | Name | Date |
| --- | --- | --- |
| 2,358,219 | Dickson et al. | Sept. 12, 1944 |
| 2,403,251 | Watson | July 2, 1946 |